Patented June 16, 1953

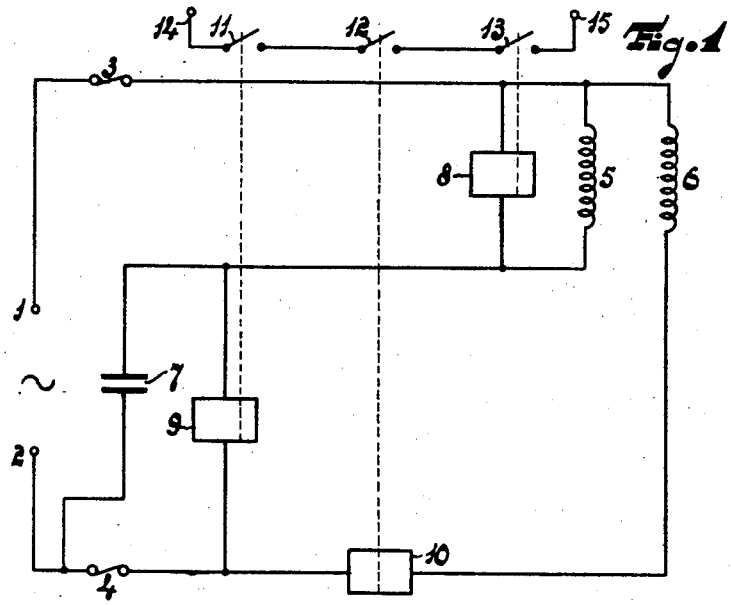
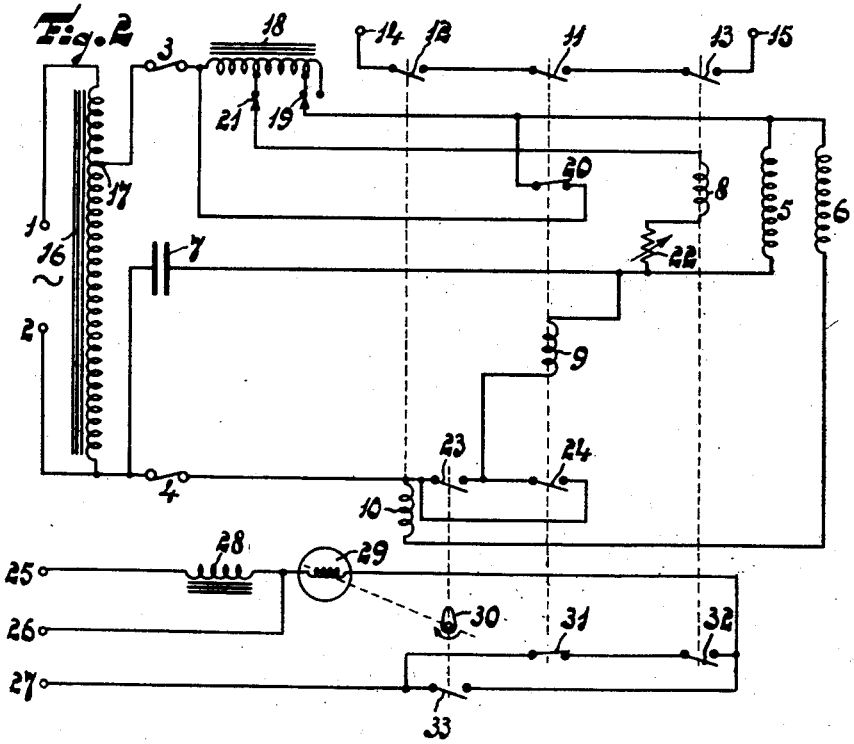

2,642,540

UNITED STATES PATENT OFFICE 2,642,540

CIRCUIT ARRANGEMENT FOR X-RAY TUBES

Matthew Berindei, Cheam, and William Tennet, Wallington, England, assignors to Hartford National Bank and Trust Company, Hartford, Conn., as trustee Application August 28, 1951, Serial No. 243,992
In Great Britain September 11, 1950

5 Claims. (Cl. 250—93)

This invention relates to protective circuit arrangements for a rotating anode type X-ray tube, the anode of which is rotated by a capacitor electric motor.

X-ray tubes of the rotating anode type are designed with a view to increasing the permissible loading per unit area of effective X-ray focus. This is accomplished by rotating the anode during operation so that the point on which the electron stream impinges is continuously changed. If, due to a fault occurring in the motor windings or in any part of the electrical circuit associated therewith, the anode of the tube is not rotated while the tube is in operation, the tube is damaged or destroyed.

Protective circuits are known for preventing the operation of an X-ray tube when the anode is not rotating. However, the known protective arrangements have been responsive only to certain faults and have not been effective against others.

The object of the present invention is to provide a protective circuit arrangement which provides a greater measure of protection than previous arrangements.

According to the present invention, a protective circuit arrangement for a rotating anode type X-ray tube, the anode of which is rotated by a capacitor electric motor, comprises a current operated relay connected in series with the phase motor stator winding across the A. C. supply, a voltage operated relay connected across the motor stator winding in the capacitor branch and a voltage operated relay connected between the ends of the phase and the capacitor branch stator windings which are not connected together, the said relays controlling the application of the high-tension voltage to the X-ray tube, whereby the operation of the tube may be prevented when the anode is not being rotated. The term "relay" is to be understood to mean any electric or electromagnetic device or circuit responsive to a change in a circuit condition, and which thereupon actuates other devices or circuits.

When an X-ray tube is used to expose a photographic film, the period of operation is normally quite short, while when a tube is being used to give an image on a fluorescent screen the period of operation may continue for some minutes. The windings of the capacitor motor used to rotate the anode are conveniently designed to operate only for a short period at the full voltage of the supply. The full voltage may be applied, therefore, only for short exposures or for a short initial period to provide a high starting torque for the motor and the motor windings will become overheated if the full supply voltage is applied for a period longer than that for which they are designed. It is customary to reduce the voltage applied to the motor when the tube is in operation for longer periods.

According to one form of the invention, one of said relays of the protective circuit arrangements is arranged to connect a choke in series with the motor stator windings when the tube is in operation and the relay which performs this operation is conveniently the voltage operated relay connected across the motor stator winding in the capacitor branch.

According to another form of the invention, a protective circuit arrangement has a time-delay which is set into action by the operation of one of the voltage operated relays, the time-delay device controlling a switch connected in series with the other voltage operated relay after a predetermined time interval, whereupon the relays become effective to enable high-tension to be applied to the tube. The time-delay device is self resetting.

In order that the invention may be readily carried into effect, two examples of protective circuit arrangements will not be described in detail with reference to the accompanying drawings, of which:

Figure 1 is a schematic circuit diagram of the protective circuit arrangement in its simplest form, the three relays being shown in block form and Figure 2 is a schematic circuit diagram of a preferred form of the protective circuit arrangement. Corresponding elements in the two figures are given the same reference numerals.

In Figure 1, the windings 5 and 6 are the stator windings of a motor for rotating the anode of an X-ray tube and the windings 5 and 6 are connected together at one end and connected through a fuse 3 to one pole 1 of an alternating current supply. The phase stator winding 6 is connected in series with a current-operated relay 10 and a fuse 4 to the other pole 2 of the A. C. supply. The stator winding 5 in the capacitor branch is connected in series with a capacitor 7 to the pole 2. A voltage-operated relay 8 is connected across the stator winding 5 and the second voltage-operated relay 9 is connected between the ends of the stator windings 5 and 6, in this case, through the current-operated relay 10. The relays 8, 9 and 10 are arranged respectively to close the switches 13, 11 and 12 which are connected in series between the terminals 14 and 15 and form part of the circuit through which the high-tension voltage is applied to the X-ray tube.

In normal operation, when the A. C. supply is connected to the terminals 1 and 2, the relay 8 is operated by the difference of potential across the stator winding 5, the relay 9 is operated by the difference of potential between the ends of the windings 5 and 6 and the relay 10 is operated by the current flowing in the phase branch of the motor windings. In consequence, the switches 11, 12 and 13, are closed and the high-tension voltage is applied to the X-ray tube.

The circuit part between the terminals 14 and 15 forms part of a timing circuit comprising a timing device which maintains the tube in operation for a predetermined period after the high-tension voltage is applied and then disconnects the high-tension voltage from the tube.

If a fault develops in the motor circuit, one or more of the relays fail to operate and the high-tension voltage is not applied or, if already applied, is disconnected.

If a break occurs in the wiring between the terminal 1 and the junction of the windings 5 and 6 and the relay 8, none of the relays operate. If a break occurs between the capacitor 7 and the relay 9, the relay 8 fails to operate, while if the break is between the relay 9 and the winding 5 the relay 9 fails to operate. If a break occurs between the terminal 2 and the relay 9, the relays 9 and 10 fail to operate and if the break is between the relay 9 and 10, the relay 9 fails to operate. In the event of a break occurring in the winding 5, relay 9 fails to operate and if a short-circuit occurs in the winding 5, the relay 8 fails to operate. If a break occurs in the winding 6, the relay 10 fails to operate and in the event of a short-circuit in the winding 6, the relays 8 and 9 fail to operate and the fuses 3 and 4 will blow. If the capacitor 7 becomes open-circuit, the relay 8 fails to operate and the event of a short-circuit in the capacitor 7, the relay 9 fails to operate.

Accordingly, it will be seen that the protective circuit arrangement according to Figure 1 is effective against a large variety of possible faults which may occur in the motor circuit and which would prevent the anode from being rotated.

In Figure 2, the terminals 1 and 2 of the alternating current supply are connected to the outer ends of an autotransformer 16, the tapping 17 of which is connected through the fuse 3 to one end of a voltage dropping choke 18. The tapping 19 of the choke 18 is connected to the common ends of the motor stator windings 5 and 6. The winding 5 is connected through the capacitor 7 to the terminal 2 as in the arrangement of Figure 1, and the winding 6 is connected through the current operated relay 10 and the fuse 4 to the terminal 2. The tapping 19 is also connected to one side of a switch 20, the other side of which is connected to the junction between the fuse 3 and the choke 18. The switch 20 is normally closed and is opened by the operation of relay 9. The tapping 21 of the choke 18 is connected to one end of the voltage-operated relay 8, the other end of which is connected to one end of a variable resistance 22. The other end of the resistance 22 is connected to the end of the stator winding 5 so that, in this case, the voltage-operated relay 8 is connected across the winding 5 through the resistance 22 and through the part of the choke 18 which is between the tappings 21 and 19. The relay 9 is connected between the stator winding 5 and the junction of two switches 23 and 24 the other sides of which are connected together and to the junction between the relay 10 and the fuse 4. The switch 24 is normally open and is closed by the operation of the relay 9.

The terminal 25, which is one pole of an alternating current supply of, say, 240 volts, is connected to one end of a voltage dropping choke 28, the other end of which is connected to one side of a time-delay motor 29. The other side of the time-delay motor is connected through switch 33 to the other pole 27 of the alternating current supply. The junction between the choke 28 and the motor 29 is connected to the terminal 26, which is for a lower voltage alternating current supply, say of 110 volts. Two switches 31 and 32 are connected in series across the switch 33. The timing motor 29 rotates a shaft carrying a cam 30 which controls the switches 23 and 33 in a manner which is described in detail below. The switch 31 is normally closed and is opened by the operation of relay 9. The switch 32 is normally open and is closed by the operation of relay 8.

The series connected switches 13, 11 and 12 are closed respectively by the operation to the relays 8, 9 and 10 in the manner of the arrangement described with reference to Figure 1.

The circuit arrangement shown in Figure 2 operates in the following manner:

When the alternating current supply is applied across the autotransformer 16, the full mains voltage is applied to the motor windings 5 and 6 because the voltage dropping choke 18 is shorted out by the closed switch 20 and the motor provides a high initial torque to start the tube anode rotating. The relay 10 operates due to the current flowing in the phase branch of the motor winding and closes switch 12. The relay 8 also operates due to the voltage across the windings 5 and the switches 13 and 32 are closed thereby. The closure of the switch 32 completes the circuit of the time-delay motor 29 which is thereby started and rotates the cam 30. Immediately the cam 30 moves from its starting position, the switch 33 is closed and maintains the motor circuit independently of the series switches 31 and 32.

After a predetermined interval of, say 0.8 to 1.0 second, the rotation of the cam 30 is such as to close the switch 23, the switch 33 being kept closed meanwhile. The switch 23 completes the connection of the relay 9 between the ends of the windings 5 and 6 so that it operates due to the potential difference between them. The operation of relay 9 closes switch 11 and enables the high-tension voltage to be applied to the tube. The operation also opens the switch 20 causing the choke 18 to be connected in series with the motor windings 5 and 6, so reducing the voltage applied thereto. Finally the operation of relay 9 closes switch 24 which maintains the connection of the relay independently of the cam-operated switch 23.

The time-delay motor 29 continues in operation for a further predetermined interval of, say, one second. After this time, that is, approximately 2 seconds from the switching-on of the motor, the cam 30 has made one completed revolution and rotates to the position in which switch 33 is opened. This operation switches off the time-delay motor. The X-ray tube then remains in operation for such time as is predetermined by the setting of a timing device in timing circuit in which the switches 13, 11 and 12 are connected.

Apart from the refinements of operation described above, the circuit arrangement of Figure 2 operated in the same manner as that described with reference to Figure 1 in that a large variety of possible faults which may occur in the motor circuit will cause one or more of the relays to fail to operate, as previously described, or, if the fault should occur during the operation of the tube, will cause one or more of the relays to fall out thus disconnecting the high-tension voltage from the tube.

What we claim is:

1. A protective circuit arrangement for a rotating anode type X-ray tube, the anode of which is rotated by a capacitor electric motor, comprising a current operated relay connected in series with the phase motor stator winding across the A. C. supply, a voltage-operated relay connected across the motor stator winding in the capacitor branch and a voltage-operated relay connected between the ends of the phase and capacitor branch motor stator windings which are not connected together, the said relays controlling the application of the high tension voltage to the X-ray tube, whereby the operation of the tube may be prevented when the anode is not being rotated.

2. A protective circuit arrangement according to claim 1, in which one of the said relays is arranged to connect a choke in series with the motor stator windings while the tube is in operation.

3. A protective circuit arrangement according to claim 2, in which the relay connected between the ends of the phase and capacitor branch motor stator windings which are not connected together is arranged to connect a choke in series with the motor stator winding while the tube is in operation.

4. A protective circuit arrangement according to claim 1, in which a time-delay device is set into action by the operation of one of voltage-operated relays, the time-delay device controlling a switch connected in series with the other voltage-operated relay after a predetermined time interval, whereupon the relays become effective to apply the high-tension voltage to the tube.

5. A protective circuit arrangement according to claim 4, in which the time-delay device puts itself out of operation after a further predetermined interval.

MATTHEW BERINDEI.
WILLIAM TENNET.

References Cited in the file of this patent

UNITED STATES PATENTS

| Number | Name | Date |
|---|---|---|
| 2,185,826 | Atlee | Jan. 2, 1940 |
| 2,242,812 | Brown | May 20, 1941 |
| 2,486,089 | Zaveles | Oct. 25, 1949 |